US011954987B2

(12) United States Patent
Goldstein

(10) Patent No.: US 11,954,987 B2
(45) **Date of Patent: *Apr. 9, 2024**

(54) INVISIBLE ACOUSTIC SAFE

(71) Applicant: Intellishot Holdings Inc., Delray Beach, FL (US)

(72) Inventor: Steven Wayne Goldstein, Delray Beach, FL (US)

(73) Assignee: Intellishot Holdings Inc., Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,681

(22) Filed: Mar. 13, 2023

(65) Prior Publication Data

US 2023/0215253 A1 Jul. 6, 2023

Related U.S. Application Data

(63) Continuation of application No. 17/321,434, filed on May 15, 2021, now Pat. No. 11,631,307.

(60) Provisional application No. 63/025,737, filed on May 15, 2020.

(51) Int. Cl.

| | |
|---|---|
| ***G08B 13/16*** | (2006.01) |
| ***G08B 7/00*** | (2006.01) |
| ***G08B 13/19*** | (2006.01) |
| ***G08B 13/196*** | (2006.01) |
| ***G08B 13/24*** | (2006.01) |
| ***G08B 15/00*** | (2006.01) |
| ***G08B 15/02*** | (2006.01) |

(52) U.S. Cl.

CPC ........... *G08B 13/1618* (2013.01); *G08B 7/00* (2013.01); *G08B 13/19* (2013.01); *G08B 13/19602* (2013.01); *G08B 13/24* (2013.01); *G08B 15/005* (2013.01); *G08B 15/02* (2013.01)

(58) Field of Classification Search

CPC .... G08B 13/00; G08B 13/1618; G08B 15/00; G08B 21/22; G08B 15/005; G08B 13/122; G07C 9/37; G06F 21/554

See application file for complete search history.

(56) References Cited

U.S. PATENT DOCUMENTS

| | | | | |
|---|---|---|---|---|
| 5,916,087 | A | 6/1999 | Owens | |
| 8,471,700 | B1 * | 6/2013 | Merrill .................. | G08B 25/01 340/539.1 |
| 9,119,539 | B1 | 9/2015 | Dotan et al. | |
| 9,480,846 | B2 | 11/2016 | Strother et al. | |
| 10,002,474 | B1 | 6/2018 | Fernandez | |
| 10,629,058 | B1 | 4/2020 | Nengelken | |
| 2003/0163709 | A1 | 8/2003 | Milgramm et al. | |
| 2003/0214418 | A1 | 11/2003 | Hahne et al. | |
| 2005/0285747 | A1 | 12/2005 | Kozlay | |

(Continued)

*Primary Examiner* — Mirza F Alam

(74) *Attorney, Agent, or Firm* — HEA Law PLLC; Darrin A. Auito

(57) ABSTRACT

The present disclosure describes a system and method designed to protect the contents of a region or space within a facility (e.g., building, home, vehicle, outdoor space, etc.). The system is configured to identify an area to be protected (e.g., nightstand, medicine cabinet, safe), monitor surroundings, and manage and deploy response(s) to threats to the region or space under protection. The system may also be configured to provide incremental warnings, interventions, or countermeasures to deter people or animals from accessing the Protected Space.

23 Claims, 1 Drawing Sheet

(56) References Cited

U.S. PATENT DOCUMENTS

| | | | | |
|---|---|---|---|---|
| 2006/0049938 | A1* | 3/2006 | Wilson | G08B 3/10 340/541 |
| 2006/0055534 | A1 | 3/2006 | Fergusson | |
| 2006/0248341 | A1 | 11/2006 | Lambert et al. | |
| 2010/0031139 | A1 | 2/2010 | Ihara | |
| 2010/0304874 | A1 | 12/2010 | Abatemarco | |
| 2011/0102137 | A1 | 5/2011 | Schroeter et al. | |
| 2012/0222667 | A1 | 9/2012 | Vendramini et al. | |
| 2012/0298119 | A1 | 11/2012 | Reese et al. | |
| 2013/0244724 | A1 | 9/2013 | Monti et al. | |
| 2015/0254948 | A1 | 9/2015 | Acosta et al. | |
| 2015/0347902 | A1* | 12/2015 | Butler, Jr. | G06F 21/554 706/46 |
| 2016/0232774 | A1* | 8/2016 | Noland | G08B 25/10 |
| 2018/0122167 | A1 | 5/2018 | Maggioni | |
| 2018/0349589 | A1 | 12/2018 | Perna et al. | |
| 2019/0278897 | A1 | 9/2019 | Zhang et al. | |
| 2020/0003511 | A1 | 1/2020 | Deng et al. | |
| 2020/0035052 | A1 | 1/2020 | Arnold | |
| 2021/0020008 | A1 | 1/2021 | Deutsch | |
| 2021/0084451 | A1* | 3/2021 | Williams | G16H 80/00 |

* cited by examiner

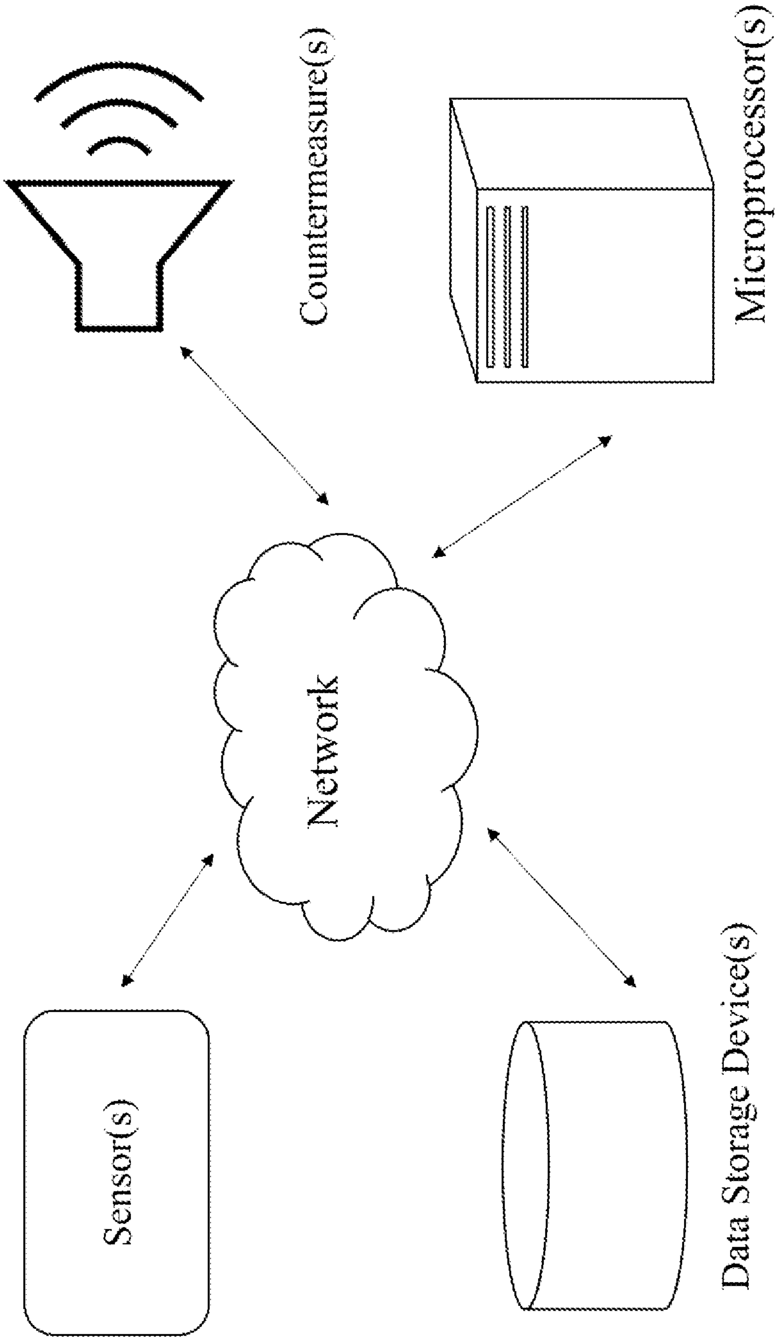
Countermeasure(s)
Microprocessor(s)
Network
Sensor(s)
Data Storage Device(s)

INVISIBLE ACOUSTIC SAFE

REFERENCES TO THE RELATED PATENT APPLICATION

The present application claims priority to and is a continuation application of pending U.S. application Ser. No. 17/321,434, filed on Jun. 15, 2021, which claims benefit of U.S. Provisional Application No. 63/025,737, filed on May 15, 2020. The content of the above documents is incorporated herein by reference in its entirety.

TECHNICAL FIELD

The subject matter described herein relates to systems and methods designed to safeguard the contents of a region or space, namely systems and methods configured to identify an area to be protected, monitor the surroundings, and manage and deploy responses (countermeasures) to threats to the area under protection.

BACKGROUND

Technology may provide the answers in the quest to resolve some of our nation's most controversial societal issues, including theft of property, gun violence, and accidental shootings.

As one example, in the past decade, over one million Americans have been shot, and approximately 31,000 people are killed each year by firearms. Preliminary FBI data for the first six months of 2020 shows increased gun violence during the Coronavirus pandemic, e.g., murder and non-negligent homicide up nearly 15% compared to the same period in 2019. On top of this, shelter-in-place orders have led to major spikes in gun ownership and accidental shootings at home by children.

To reduce the harm caused by the widespread use of guns, various technological solutions have been proposed that aim to reduce access to firearms by unauthorized individuals (e.g., children, elderly, untrained individuals, criminals, etc.). However, many of these solutions, e.g., modifications to the gun (e.g., biometrics, physical locks, etc), physical gun safes, etc., have not been adopted for reasons of quick accessibility or listlessness. Consequently, this is a recipe for unintended consequences, as these weapons become instruments of destruction based on accessibility.

As another example, on an average day, 3900 people will use a prescription opioid outside of legitimate medical purposes and supervision. These prescription drugs are often obtained through theft from people with legitimate prescriptions. Sometimes it is not enough to simply keep prescription drugs secured, locked away, and out of the reach of others. Drug abusers and traffickers too often locate and/or forcefully obtain access to the prescription drugs to meet their illegitimate ad/or illegal needs.

Embodiments of the present disclosure are directed toward solving these and other problems individual and collectively.

SUMMARY

The present disclosure describes a system and method ("Invisible Safe") designed to protect the contents of a region or space ("Protected Space"), within a Facility (e.g., building, home, vehicle, outdoor space, etc.). The system and method identifies the area to be protected, monitors the surroundings, and manages and deploys responses to threats to the region or space under protection.

According to one embodiment, the response system is configured under the design policy of Incremental Intervention, e.g., there are more severe or adverse interventions (e.g., countermeasures) deployed to zones that are closer to the Protected Space. This allows for the design of a set of incremental interventions that include, for example, low-level alert(s), followed by mid-level warning(s), then pre-emptive moderate interventions, and then full-scale interventions.

According to another embodiment, the Protected Space and Buffer Zones, may be automatically generated by the system based on, for example, knowledge of the space, its purpose, likely inhabitants and activities, and the types of contents to be stored in the Protected Space (e.g., wristwatch, medicine, or firearm). For example, by including an artificial intelligence engine, a database of previously configured/established Protected Spaces may be continually updated, including data from local facility as well as a network of Protected Spaces at other facilities.

According to another embodiment, a system includes a sensor or sensors configured to monitor the physical space; access rules configured to determine what is the area to be protected and how to respond with countermeasures; algorithms designed to make decisions based on data received from the sensor and rules; an electronic processor(s) configured to execute the algorithms; one or more acoustical countermeasures designed to deter intruders; data storage device(s) configured to store data locally or remotely; and wireless or wired communication links between the sensors, processors, countermeasures, data storage (e.g., cloud based and/or local), and other deterrent systems.

The system may be configured to define Protected Space and Buffer Zones based on an initial setup of the system and access rules defined by a user or automatic algorithms. The rules may be designed to provide instructions for how to monitor and respond to events within or targets entering the Protected Space and Buffer Zones.

The system may be configured to, upon determining the Protected Space or Buffer Zone rules are breached, process sensor data using the rules to make a determination on which (acoustical) countermeasure(s) to use and at what intensity level based on current events and desired target behavior modifications.

Additional aspects will be set forth in part in the description which follows, and in part may be derived from the description, or may be learned by practice. The aspects will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The following drawing illustrate one example of various components of embodiments of the disclosure described herein and is for illustrative purposes only. Embodiments of the present disclosure are illustrated by way of example and not limitation in the figures of the accompanying drawing, and in which:

FIG. 1 is a block diagram of an invisible safe enabled with countermeasures to mitigate access of Protected Space, according to one embodiment of the present disclosure.

DETAILED DESCRIPTION

According to one embodiment, a Protected Space (also identified as Zone 0 (zero)) is defined as a subspace within a Facility, with boundaries defined by either a simple radius from the center of the Protected Space (e.g., a spherical protection zone), or by a more complex set of three-dimensional boundaries. The boundaries of the Protected Space may correspond to and coincide with the boundaries of an object or physically defined space. That is, the boundaries of the Protected Space may be the same as the sides of a physical box or enclosure (e.g., a traditional lock box or safe or drawer), in which case the physical enclosure may form part of the overall Invisible Safe system. This configuration (i.e., incorporating a physical box) would allow, for example, the deployment of a wider range of interventions or countermeasures, and each individual intervention or countermeasure may not need to be as robust. However, there are other tradeoffs with this configuration, such as potentially slower access to the contents of the Protected Space by authorized individuals. Thus, for maximum flexibility of configuration and deployment, the presence of a physical enclosure is not required, and the Protected Space may be defined via a set of purely virtual boundaries.

The boundaries for the Protected Space may be defined manually via a user interface, or automatically by the system. They can be imported from a computer vision system. The user interface to manually configure the Protected Space and its boundaries may include a graphical user interface (GUI), and a speech user interface. Users interact with a rendering of the facility, and select boundary points, planes, and/or radius. To automatically define the Protected Space, the system interrogates the facility model, and generates a Protected Space that considers facility constraints such as walls, floors, ceilings. For example, the system may generate a 2-meter cube around the center of the Protected Space, then trim out invalid portions of the cube that fall outside a wall, or below a floor. This avoids the "thin wall problem" that is common in tracked spaces, namely the situation where a person might be only one meter away from a center of the Protected Space (thus seemingly inside the Protected Space), but is actually located in an adjacent room, on the other side of a wall. That individual will not be considered a threat to the Protected Space, because the invalid portions of the Protected Space have been automatically trimmed/adjusted.

In addition to the boundaries of the Protected Space, a series of additional boundaries are defined, so as to create regions of space ("Buffer Zones") outside the Protected Space. The Buffer Zone closest to (contiguous with) the Protected Space is identified as Zone 1; the next distal region is identified as Zone 2; and so on for subsequent Buffer Zones. There is at least one Buffer Zone outside the Protected Space (Zone 1), and there may be arbitrarily many zones identified, numbered 1, 2, 3 . . . N.

The boundaries of the Zones 1 . . . N may be identified manually via a user interface, or automatically by the system. If the zone boundaries are defined automatically, the system defines a radius of closest approach, meaning the minimum distance from any boundary of the protected zone, then either creates a sphere of that radius, centered on the protected zone, or mimics the boundary planes of the protected zone to create a similarly-shaped Zone 1, with larger dimensions. For example, the system could create a protected zone of 2 cubic meters, then create a Zone 1 boundary defined by a 3-meter cube (i.e., a 1-meter standoff from the protected zone). The boundaries of the automatically-defined Zones 1 . . . N may be trimmed by interrogating the facility model for invalid portions of the Protected Space, as described in the creation of the Protected Space.

The automated generation of the protected zone and the subsequent Buffer Zones also leverage, for example, knowledge of the space, its purpose, likely inhabitants and activities, and the types of contents to be stored in the Protected Space. A database of previously configured/established Protected Spaces is continually updated, including data from local facility as well as a network of Protected Spaces at other facilities.

The owner can set up one Protected Space, then save those settings and replicate them with a second or subsequent Protected Space. The system can also automatically configure the Protected Space (and Buffer Zones) by comparing the local features of the facility model to features in the database of Protected Spaces obtained through the network of Protected Spaces and facilities. The features of the space that are used to automatically configure the Protected Space and Buffer Zones include, but are not limited to, facility category (e.g., medical clinic versus private home), protected storage type or purpose (e.g., medicine storage facility versus homeowner's bedroom nightstand), typical occupants (e.g., medical staff versus family members), and storage contents (e.g., opioid medicine versus handgun). The shape and size of the protected zone and the Buffer Zones can be automatically configured using information from the facility model and the database of prior configurations.

The system may also be configured to automatically configure (e.g., artificial intelligence engine) the Protected Space and Buffer Zones by sensing the contents of the space. For example, sensors including but not limited to cameras, LIDAR, or ultrasound identify a room as being a bedroom, with a bed and a nightstand, and automatically configure a 0.5×0.5×0.5 meter Protected Space on one of the nightstands. Given that the facility is a bedroom, the system automatically sets the Buffer Zone sizes and shapes based on the database of rooms, typical traffic patterns in such a room, the typical occupants of that room (including, for example, the homeowners who sleep in that room, plus children who may also enter the room).

The system may also be configured to monitor the Protected Space and/or Buffer Zones, and automatically adjust boundaries based on changes to the facility model or changes in the area around the Protected Space. For example, if sensors identify that the bed has been moved to a new place in the room, so the boundaries of the Protected Space on the nightstand, and the Buffer Zones, are automatically adjusted accordingly. Or, for example, if more traffic is detected in the area around the Protected Space, the boundaries of the Protected Space and/or Buffer Zones can be adjusted. Any of these changes may be based on periodic reassessment of the space, up to and including real-time dynamic adjustments.

The system may also be configured to automatically configure or reconfigure the Protected Space and/or Buffer Zones based on the contents of the facility. For example, if a wristwatch is identified on the nightstand, the system can configure the Protected Space to be 0.5 cubic meter and Buffer Zones to increase by 0.5 meter. However, if a handgun is identified on the nightstand, the system would typically configure the Protected Space and Buffer Zones to be larger, in anticipation of a higher-value item requiring a more vigorous defense. The reconfiguration of the Protected Space and/or Buffer Zones can be done dynamically such that if the contents of the facility change, the configuration will also change accordingly. For example, if there is a Protected Space on top of the nightstand, and a wristwatch identified in the Protected Space, then an authorized user places a handgun on the nightstand beside the wristwatch, then the system will dynamically adjust or reconfigure the Protected Space and/or Buffer Zones (e.g., make the Buffer Zones larger).

In addition to the shapes and sizes of the Protected Space and Buffer Zones, the system configuration includes the intervention that will be directed at any threat that enters the Buffer Zone or Protected Space. The mapping of intervention to zone (i.e., what intervention is applied or triggered, when an intruder enters Zone 3, then Zone 2, then Zone 1) may be configured manually via a user interface, or automatically by the system. Automatic configuration of the interventions leverages the data and processes described above, including but not limited to the database of previous installations; dynamic changes to the facility, occupants, movement, etc.; or identification of the contents of the facility. For example, the intervention associated with breaching the boundary of Zone 2 would typically be more aggressive (more noxious, aversive) if there were a handgun in the Protected Space than if there were a wristwatch.

Incremental Intervention (aka Countermeasures)

Under the design policy of Incremental Intervention, there are more severe or adverse interventions (e.g., countermeasures) deployed to zones that are closer to the Protected Space. This allows for the design of a set of incremental interventions that include, for example, low-level alert(s), followed by mid-level warning(s), then pre-emptive moderate interventions, and then full-scale interventions. For example, a non-verbal audio chirp can be associated with Zone 4, such that when a person enters that zone the chirp alert is played; entering Zone 3 could trigger a recorded voice saying "Restricted zone"; entering Zone 2 could then result in a brief but loud deterrence sound, plus a louder verbal recording of "Step Back!"; entering Zone 1 would trigger a complete full-volume blast of deterrence audio, stroboscopic light, and electric shock. As described above, the specific interventions mapped onto the zones can be manually or automatically assigned, and may also be dynamically adjusted or reconfigured. The data used to adjust the interventions can also depend on the specific nature of the threat. For example, a young child wandering into the parents' bedroom and slowly approaching the area of the nightstand, warrants a different zone configuration and intervention mapping than does an unidentified adult walking quickly into the bedroom and heading directly for the gun on the nightstand.

Audio Elements of System

In each of the various phases of system operation (e.g., learning, monitoring, threat detection, adverse incident identification, and intervention), audio may be utilized by the system. In this disclosure, the term audio refers broadly and inclusively to any combination of the generation, transmission, or detection of vibrational energy. This may certainly include, but is not limited to, uses of audible sounds such as, for example, the creation of an audible warning sound that is played via a loudspeaker or other transducers capable of delivering frequencies that can be experienced by a typical human or animal; or the detection of the characteristic sound of a gunshot; or the transmission of a very loud sound directed at a perpetrator.

However, the use of many other types of audio is also contemplated, not limited to audible sounds. This may include, but are not limited to, the generation, transmission, or detection of ultrasound (vibrational energy at frequencies greater than the typical perceptual range of human hearing), or of infrasound (vibrational energy at frequencies lower than the typical perceptual range of human hearing; these sounds may be "felt" by a human).

Vibrational energy utilized by the system may be transmitted through any available substance or medium, including but not limited to, air, water, building materials, and/or body tissues.

Audio used by the system may be of any duration or durations; any frequency or any combination or pattern of frequencies; at any location or locations near to or within the facility.

Audio and Initial Analysis of Facility

Audio for mapping and modeling. Audio of many types may be used in constructing a facility map or facility model. An example of this may be the use of active sonar pings or ultrasound pulses to help construct a spatial model of the facility. In addition to spatial mapping, audio may be used to help contribute structural information to the facility model. Sound-based mapping may lead to information about the density of different building materials, such as identifying walls that are made from concrete versus walls that are framed in wood and drywall. As a result, the facility model may contain derivative safety information, such as the expected safety of a particular room in the event of a specific threat (e.g., a concrete-walled room in the event of an intruder with a handgun). The facility model may also contain derivative information related to expected performance of audio interventions, such as the expected perceivability of a fire alarm, or the expected collateral impacts of an acoustic weapon due to the reflectance of the walls.

Acoustic signature of facility. One or more audio sensors, including but not limited to microphones, hydrophones, and vibration sensors, may be used to capture the audio in the facility. As noted above, this audio (potentially from multiple sensors and sources) may be used to generate or contribute to the facility model. In addition to the spatial and structural layout of the facility, the facility model may also include other information such as, for example, areas of the facility that are more acoustically resonant, noisy, or produce more echoes. The facility model may also have a temporal component, such that, for example, the typical or expected audio at a location in the facility can be described, for example, for a particular time of day, or season of the year. The facility model may also have other components, such as knowledge of events. This would, for example, characterize the audio at a particular location in the facility (e.g., an auditorium), during a given time (e.g., the month of May), when a certain type of event is happening (e.g., the auditorium is full of people attending a concert).

The facility model would integrate audio with data of other modalities, such as visual information from cameras, data from pressure sensors, turnstiles, magnetometers, and so on. After a learning phase, the facility model would be able to determine a multimodal baseline, or an expected ("normal") facility state, at any location or time or event.

Audio for active baselining. In addition to sensing audio and vibration in a more passive manner, such as is described above, audio may also be used in an active manner to determine the characteristics of the facility. For example, standardized test sounds (aka "impulse") may be played from public address loudspeakers or other transducers when the building is empty, half full, or full of people; and microphones or other sensors capture the resulting filtered, attenuated, echoed, or otherwise transformed sounds (aka, the "impulse response"). Comparing the impulse to the impulse response allows for the standardized test sounds to be played at some later time, to serve at that later time as a probe of how many people are in the building.

Compare to audio baseline at other facilities. The facility model may be compared to, and may be improved by and also contribute to, data from the model developed for other facilities. For example, a facility model for one elementary school may be used to develop or improve the facility model for another elementary school. Such inter-model comparisons may happen during any phase of operation.

Communication during installation, configuration and learning. Audio may be used as a communication channel between occupants of the facility during all phases of operation, including but not limited to construction, configuration, setup, analysis, modeling, and operation of the facility. This can include audio transmitted in any manner to, though, within, or from the facility. Secondary devices, for example radios, may be used in this audio communication. Direct transmission may also be used, such as playing audio via loudspeakers or via vibrational transmission through the floor, walls, or other structural elements of the facility.

Audio for Threat Detection in Operational Mode

When the system is in operational mode (e.g., monitoring, or intervening), the system may use audio of various types, in various ways, for various purposes. Examples are described below.

Departures/deviations from baseline audio signature. As the system collects data about the facility in an ongoing manner, the system will be able to compare the monitored data to the model and baseline. This will allow the system to identify departures from the model/baseline. For example, a louder overall level of audible sound, plus greater structural vibration, may be identified as a deviation or departure from the normal or expected levels for that location, time, and facility event status. These departures in audio (or in any other data modality or modalities) may be characterized by the machine learning/artificial intelligence component of the system as a potential threat, with an increased risk of an adverse event.

Audio and Threat Determination. Separate from the use of audio signatures or facility model baselines described above, audio (broadly defined, and including vibration, etc.) may be used more specifically and directly to identify potential threats. The system, via its network of audio sensors, will monitor the facility for audio signals, and process detected signals either distally (at the sensor location, via distributed signal analysis and signal processing subsystems) or centrally (in a portion of the system that combines signals from one or more sensors and applies signal analysis and processing) or both. The system identifies any audio that may indicate a threat to the facility. Some examples of the types of audio signals that may be relevant are listed below. Threat determination may result from monitoring or analyzing the audio signals alone, or may also involve or incorporate other information. Such information may include but is not limited to, the location of the audio event within the facility, the presence or contents of signals from other sensors in or near the facility, the time of day, the day of the week, day of the month, time of year, season, weather information (temperature, pressure, humidity, wind speed, freeze warnings, precipitation amounts, etc.), individuals in or near the facility, activities in or near the facility, or any combination of information.

Audio detection. The simple presence of audio (including vibration) may indicate a potential threat. For example, any noise detected inside a school when the school is closed for the weekend may indicate a potential threat: if the school is typically silent during that time, the presence of noise or vibration may indicate the atypical presence of individuals in the building; or may indicate a leaking pipe or malfunctioning ventilation fan. The system monitors for audio that may indicate a threat, either separately or in combination with other information, as described above.

Audio level detection. In addition to, and more specifically than the simple detection of audio (discussed above), the measurement of a particular intensity of audio (including being at, above, or below a threshold) may indicate a potential threat. For example, very loud sounds might indicate a chaotic situation in a school. Conversely, a very low level of sound in the middle of the school day might be abnormal in a school classroom. The system monitors and detects audio and determines if the acoustic level indicates a threat to the facility.

Audio feature detection. Detection of the presence (or absence) of a particular kind of audio feature or audio signal characteristic may be evidence of a potential threat. For example, rattling, buzzing or sharp onset/cracking sounds might provide evidence of an abnormal situation such as structural damage to the facility, and therefore a potential threat. The system monitors the audio signals, processes them to identify acoustic features, and compares those features to templates and samples in a database of sound features, in order to identify potential threats to the facility.

Audio identification. The identification of the audio associated with a specific kind of source or object or activity or event may provide evidence of a potential threat. For example, potential threats may be signaled by the sound of a gunshot; or the sound of the chambering of bullet in a gun; or smashed glass; or the infrasound and vibration associated with an earthquake. The system monitors the audio signals, processes them to identify specific characteristic sounds, and determines if any identified sounds indicate potential threats.

Audio localization. The location of a static audio source, or the direction of movement of a dynamic audio source may provide evidence of a potential threat or may also contribute to the response to an adverse event. For example, an array of sensors may be able to determine the location from which a bullet was shot. Or the direction that a person is running may be determined by the combined pattern of the sound of footfalls and structural vibrations. The system monitors the audio signals, processes them to identify the locations and spatial characteristics of sounds, and determines if any identified sounds indicate potential threats.

Human audio. Audio (largely audible sounds but possibly all kinds of audio) that are produced by humans may provide evidence of a potential threat. For example, the sound of screams, gasps, or yells may indicate a threat to the facility. As another example, ultrasound or infrasound can remotely detect heartbeats and therefore may detect elevated heartbeats, which in a specific time and location may provide evidence of a potential threat or of an adverse event. The system monitors the audio signals, processes them to identify human audio, and determines if any identified sounds indicate potential threats to the facility.

Audio for individual identification. Audio may be used by the system to identify a specific individual or individuals, which may be of use to the system directly, or may be used by the system to provide evidence for a threat. For example, voice sounds (spoken words) may be used to identify a speaker as a specific intruder. Or, audio from footfalls may be used in a gait analysis to assess the load an individual is carrying, or whether a limp is suspected. Or audio associated with a heartbeat may be used as part of an individual identification process. Further, audio may be used to assess the current state of an individual. For example, voice analysis may indicate level of stress of the individual, especially if an existing archived speech sample were available for reference. Thus, the system monitors the audio signals for human audio, and processes the human audio in order to identify individuals, identify current characteristics of individuals, and determine if any individuals may be a threat to the facility.

Word detection. Detection and recognition of the audio associated with utterance of a specific spoken word from a set of known words (e.g., recognizing the word "bomb" at an airport security checkpoint) may provide evidence of a potential threat. Other examples may include "fire!", "run!" or "hide!", or "gun!". A facility codeword (or code phrase; see next) may also be detected and understood as evidence of a threat. The system monitors the audio signals for speech, analyzes the speech signals, determines if specific words are detected, and if those words indicate a potential threat to the facility.

Speech comprehension. Detection and recognition of the audio associated with the utterance of a longer segment of speech, such as a phrase or sentence, may provide evidence of a potential threat. As an example, recognizing the phrase, "Everybody get on the floor!" may be a threat in a bank (but perhaps not in a dance club); or recognizing the phrase "Code Blue" in a hospital, or "Call 9-1-1" in a restaurant. The system monitors the audio signals for speech, analyzes the speech signals, determines if specific phrases are detected, and if those phrases indicate a potential threat to the facility.

Audio and non-threats. In addition to providing evidence of a potential threat or an adverse event, audio may be used by the system to provide evidence of some other status or event. For example, each of the categories/uses of audio described above may also be used to gather evidence of the lack of a threat, or the end or lack of an adverse event. For example, identification of the presence of the Principal of a school in a room, and the determination that the stress level for that individual is not elevated, and the recognition of the words, "All clear" may indicate a lack of a threat. Thus, the system monitors the audio signals, analyzes them, and either separately or in conjunction with other information (as described above) identifies other non-threat states and statuses for the facility.

Audio in Response or Mitigation or Intervention (Countermeasures)

When a threat to the facility has been identified, audio may be used for a variety of purposes, including but not limited to communication, alerting, and active intervention to encourage or deter an action or reaction. As described above, the system employs an active policy of incremental intervention, which means that the minimum intervention is deployed, to provide effective intervention results. The initial intervention is dynamically adjusted in order to maximize the likelihood of a successful resolution of the threat, with the minimum intervention. If a threat is not neutralized by, or following, initial intervention, then the intervention is escalated in intensity, quality, duration, location, and so on, as much and as quickly as required to neutralize the threat. The specific context of the deployment will determine the type and attributes of any audio intervention, as well as the timing, duration, and location of deployment.

Nominal Levels of Intervention

The nominal operational mode of the system includes three levels of intervention, labeled solely for the purposes of explanation as "alert", "caution", and "prevent". More or fewer levels of intervention may be identified. The levels of intervention may be identified by any other terms, or no terms. Even if a level of intervention is identified, the system may determine not to deploy that level, depending on the context and the goals of the system at that place and time in the facility. For example, the system may skip the alert and caution levels, and immediately deploy the prevent level of intervention. Or, alternatively, for example, the system may alert and caution, but ultimately not deploy a prevent intervention. Examples of categories of audio intervention are described below.

Alert Interventions

The system will deploy audio (broadly defined) to provide alerting and notification of threats, events, or status in a facility. Audio alert interventions are intended to provide a general, initial enunciation that the system has detected a threat or event. This may serve to notify individuals in the facility of the occurrence of the event, and of the system identification and categorization of the threat. The alert may also lead directly to an effective reduction or elimination of the threat.

In the case of a facility such as a school, examples of the types of events that would be responded to by deploying an audio alert intervention may include, but are not limited to, the entry into the facility by an unauthorized individual; the detection of sound levels that are too loud; the identification of a bullet being chambered; the identification of the spoken phrase, "He's got a gun!"; and so on. In the case of an Invisible Safe, examples of the types of events that would be responded to by deploying an alert may include, but are not limited to, an individual walking into the bedroom where an Invisible Safe is configured and active, thereby entering the most distal Buffer Zone around the Protected Space.

The specific audio or sounds that are deployed as an alert may depend on the attributes of the event, threat, or status that is being addressed. In one embodiment, the specific type of threat may determine or influence the alert. For example, one type of audio (e.g., a simple "chime") may be deployed when a person enters the building or Buffer Zone, whereas a different type of audio (e.g., a "ding-ding-ding") may be deployed when a specific spoken phrase is identified. In a second embodiment, the location of the threat may determine or influence the alert. For example, when an individual enters a particular door of the facility, the alert audio may be played near that door. In another embodiment, information about the facility, its status, occupants, or activities may influence the alert sound. For example, if the system determines that the Principal of a school is located in a particular office within the facility, then when an individual enters the building the resulting alert may be played in the room in which the Principal is located.

In addition to informing individuals about an event or threat, such as is described above, the intention of the alert audio may be to cause behavioral changes immediately, on the part of an individual related to the threat, or to others in the facility. In the case of other individuals in the facility, the alert audio will lead to heightened awareness, attention, alertness, vigilance, or caution. For example, an alert that an individual has entered a school building will cause a person (e.g., a teacher or school police/resource officer) in the building to look towards the door, to assess who is entering. If the situation is on the weekend, when no one else is expected to be entering the school, then others already in the building may exhibit more awareness and caution, may be more prepared to respond to take other actions, if necessary.

In the case of an Invisible Safe in a home, when a child enters the bedroom where the Protected Space is configured, the audio alert chime will cause the adults in the rest of the house to be more attentive and may cause them to immediately go check on why the child is in the bedroom. The audio alert may cause immediate behavioral change on the part of the individual associated with the threat. For example, if an individual enters a building and the system determines that a weapon is present, the audio alert may cause the individual to immediately stop; the audio alert may also cause the individual to remember that he or she forgot to leave his or her weapon in the car; the individual may immediately turn around, exit the facility, and safely store the weapon before returning to the facility. In the case of the Invisible Safe in the home, when a person enters a room with a Protected Space, the alert audio may immediately cause the individual to stop; the alert may also enable the individual to recognize or recall that the room is protected, that they are in a Buffer Zone; and regardless of whether or not the individual understands why the alert audio was deployed, the alert audio may cause the individual to exit the room.

The attributes of the audio used for alerts in this system are carefully designed. The audio signals will be designed for maximum perception, including but not limited to the use of frequencies in the 2000-4000 Hz range, which is the range of maximum sensitivity for human hearing. The alert audio is designed to be audible over background sounds: the system is aware of or monitors the current or typical background environmental audio, and ensures that at least one, and typically several, frequency components of the alert audio are above the level of the background sound at that frequency. Well-designed alerts have multiple frequency components that are louder than the background spectrum. The alert audio is also designed to be attention-grabbing, including but not limited to having abrupt onsets for at least one frequency component, by having a mixture of low, medium, and high frequency components, and by having a pulsing or on-off duty cycle that is detectable by the listener. The alert audio is also designed to provide the appropriate level of emotional or affective response, and/or autonomic activation by the listener. For example, the sound may be designed to be somewhat unpleasant to listen to, or/and may induce a discomfort based on the frequency components, abrupt onsets, pattern, and so on, while perhaps not causing a startling or painful result. The specific attributes of the sound, including but not limited to the frequencies, intensity, location, duration, and pattern, can be adjusted or tuned, either based on a set of rules, or dynamically, to account for the current circumstances. For example, if there is already music playing in the room, the alert audio may be adjusted (e.g., made louder) to ensure the alert is audible and results in the intended intervention effect. Such adjustments may depend on other information, for example whether the individual is a child or an adult, the speed of movement of the individual, or the time of day.

Classes of Audio in Alert Interventions

The alert audio may involve non-speech or spoken audio. The non-speech audio may be organic (naturally occurring), engineered (artificial, human-made), algorithmic, composed, random, or any other type of non-human speech audio. The audio may be simple or complex, with one or more frequency components. Frequency components may be audible (i.e., in the range of human hearing via the typical air-conducted hearing pathways), or sub- or super-audible (i.e., perceptible but via a pathway that is not the typical air-conduction hearing, such as vibrations or ultrasound). Frequency components may be defined or may be variable, and may be random. Noise (i.e., audio with some random frequency components) of all types (e.g., white noise, pink noise, or brown noise) may be used as part or all of an alert audio intervention. The audio may have any amplitude envelope, meaning that the pattern of increasing (also known as "attack"), decay, sustain, or release of the sound may be of any sort. The audio may be a single "pulse" or "burst", or may have a pattern of components, with any tempo, pattern, rhythm, or repetition. Any pattern may be fixed, variable, algorithmically determined, or random. Any attributes of the audio may be fixed or variable, including dynamically tuned based on the situation. Spoken audio may include natural or artificially generated speech, including words, phrases, sentences, and longer. Human-produced or human-like sounds that are similar to speech (collectively called speech-like sounds) such as grunts, yells, coughs, sneezes and other bodily noises may also be used. All attributes of the speech or speech-like sounds may be adjusted or changed, including dynamically, depending on the circumstances. The apparent gender of the sounds may be male, female, or other, and may depend on the circumstances. The identity of the speaker (e.g., the voice of a child's mother) may be adjusted or changed, depending on the circumstances. The contents of the speech or speech-like sounds (i.e., the words that are spoken) may include any message, or no intelligible message, and may be in any or no recognizable language. The contents and/or language may be dynamically adjusted depending on the circumstances. Speech may be presented at any rate or rates, and may be sped up even to the point of no longer being intelligible as speech (i.e., using the class of audio signals known as "spearcons").

In one of many possible embodiments, the Alert audio is a single 400 Hz chirp with a moderate rise time of 50 ms and a duration of 200 ms, played at 75 dB SPL. This is a simple audio stimulus that is played once when, in this embodiment, a child enters a parents' bedroom. The Alert audio is designed so as not to produce a startle, with a rise time that is not sudden. The audio in this embodiment is audible above the typical or likely background audio, but not so loud as to produce any physiological reaction, other than a general attending response.

In another embodiment, the Alert audio is a pattern sounds composed by playing a pre-recorded buzz or "raspberry" sound three times in rapid succession. In this embodiment, the "raspberry" sound is composed of a triangle wave played at 20 dB above the current A-weighted background noise level. In this embodiment, the Alert is played from multiple speakers or transducers in the area inside a facility entrance, in response to the entry of an individual determined to be carrying a potentially suspicious package. In this embodiment, the Alert conveys more urgency than the Alert described previously, due to the louder intensity, more complex and higher frequency components, a more rapid onset, and more repetitions. Conveying urgency via the design of the Alert sound enables more effective priming of subsequent responses on the part of those who hear the Alert.

In another embodiment, the frequency and temporal attributes of the Alert audio depend on the nature of the event that is being indicated. In this embodiment, an unknown but non-suspicious individual entering the school is indicated by the chirp sound previously described, played twice with a 500 ms silence between the repetitions, at 15 dB above the background noise level, at each of the locations where the sound is played. In this embodiment the Alert is played throughout the school. In this embodiment, there are two variations of the Alert: in one variation the first chirp is played at 250 Hz, and the second chirp is played at 300 Hz; in the second variation the first chirp is played at 300 Hz and the second is played at 250 Hz. In this embodiment, the pattern with the rising frequency pattern is played when the unknown individual enters through the front door of the school. The Alert with the descending frequency pattern is played when the individual enters via the rear door of the school. Thus, the location of the event is encoded into the Alert audio using non-speech sounds, in a simple and easily learned manner.

In a related other embodiment, the sounds for an unknown individual entering are designed as described previously, whereas the sound used as an Alert for when a suspicious individual enters is a unique and more urgent "whoop" sound (rising a pitch sweep) played three times. In this embodiment, the Alert audio also appends a spoken component (female voice) saying the word "front" or "rear" depending on the entrance door (i.e., resulting in "whoop-whoop—front"). In this embodiment, a more urgent or potentially threatening situation is alerted using a distinct, and more urgent audio pattern. Thus, the category, urgency, and location (among other information) can all be encoded into the Alert audio. In a related other embodiment, the whoop-whoop sound is followed by a spoken word indicating the type of threat, such as "gun" (i.e., resulting in "whoop-whoop—gun").

Multiple Audio Alerts

One or more audio alerts may be deployed in response to a single detected event or threat. Any alert audio associated with an event or threat may be deployed at any time and at any location. Multiple alert audio signals may be deployed in response to an event or threat, and may be the same, similar, or different, in terms of audio attributes, time, and/or location. For example, a sharp "ding-ding-ding" sound may play immediately in the bedroom when a child enters, and three seconds later the spoken word "bedroom" is played in the living room where the parents are located. Any attributes (including the actual audio, and the location) of the multiple alert audio signals may be the same, different, or dynamically adjusted. For example, the bedroom-entry "ding" may repeat, may be abrupt and adjusted to be slightly startling to the child; whereas the living room alert is whispered near the location of the parent.

Caution Interventions

Audio interventions that are intended to cause behavioral change, but not necessarily impose consequences, may be described as "cautions". The intent of the caution is to go beyond the alert intervention, and is typically, those is not required to be, deployed after an alert intervention. As was described for alert audio signals, caution audio may involve any combination of speech or non-speech audio; may be static or dynamic; may be solitary or repeated; may be single or multiple; may be in one or multiple locations; and so on. As was described for alert audio, caution audio is carefully designed to result in a specific outcome, typically a behavioral change and awareness or knowledge change; and may be adjusted depending on the circumstances.

The attributes of caution audio are typically louder, include more high-frequency components, are more intrusive, more abrupt, more startling, and more adverse. In order to cause a change in knowledge and/or behavior, cautions are more likely to, but are not required to, include speech or speech-like sounds. Caution audio can be directive, in that it causes the listener to behave in a certain way, move in a certain direction, or perform a certain type of action. For example, an audio caution may use a stern, loudly spoken message such as "Get out!" or "Step back!" to cause a specific behavior. An audio caution signal may also be or include a noxious stimulus that serves as a direct consequence, and may serve as a preview of subsequent consequences. For example, a caution audio may include a brief but very loud sound (e.g., 250 ms duration, 120 dB loud), that leads to a direct startle response, considerable discomfort, and potentially some disorientation and confusion. The caution audio is intended to make it clear that non-compliance (e.g., continuing to move toward a Protected Space, despite being told, "Step Back!") will have severe consequences, but is not intended to be a final consequence for non-compliance.

In one of many possible embodiments, the Caution audio contains the spoken phrase, "Step Back!", spoken by a male voice with an urgent, emphatic tone, presented at 100 dB SPL, and in this embodiment is played via loudspeakers that are between 1-5 meters away from the targeted individual, located directly ahead of the individual in their direction of current travel. In this embodiment the phrase is played repeatedly, with 5 seconds between repetitions, until the individual stops advancing, and moves back in the direction from which he or she came.

In another embodiment, the "Step Back" Caution audio described above is deployed near the target individual, followed after 500 ms by a brief but loud (250 ms duration, 120 dB SPL intensity) noise pulse. In this embodiment, at the same time a second Caution audio composed of a pair of buzz sounds is played in all occupied classrooms, at a level of 15 dB above the ambient sound levels in that classroom. This in-class non-speech Caution audio is interpreted by the teachers as code for "Lock down, shelter in place", without immediately conveying any specific issue to the students. In this embodiment, a third simultaneous Caution audio involving the buzz-buzz sound plus a spoken command to "Respond Hot!" is played via the school resource/police officer's radio. In this embodiment, this three-part Caution is intended to result in different behaviors by three different groups of recipients: the suspicious individual, the classroom teachers, and the police officer.

Multiple Audio Caution Signals

One or more audio caution signals may be deployed in response to an event or threat. When multiple cautions are deployed, they may be the same, similar, or different in terms of the attributes of the audio, as well as location and time. For example, one audio caution signal deployed in response to the identification of an unrecognized individual pointing a gun in a school may involve a spoken command ("Stop! Put down the gun!"), accompanied by a brief but loud disruptive noise burst, directed via multiple speakers specifically at the location of the individual. At the same time, and in response to the same event, the system may deploy repeating, non-speech klaxon sounds throughout the school, which students and staff have learned to interpret as signifying an active shooter situation. The system may, for example, also deploy a third audio caution signal at the location of the school resource officer, with urgent directions of where and how to respond to the threat.

Audio "Prevent" Type Interventions (Countermeasures)

If a threat requires a response more effective than a Caution, the system will deploy a more extreme, noxious, adverse audio intervention, which can be considered a "Prevent" intervention (also described as a countermeasure).

A Prevent intervention is a nonlethal response designed to prevent the threat from materializing. The prevent audio is designed to have extreme and debilitating effects. Prevent audio signals are typically extremely loud (e.g., greater than 140 dB SPL), may be of longer duration, may be focused from multiple sources, and contain a set of frequency components that combine to produce extreme discomfort.

The exact design of the Prevent audio signal depends on the circumstances, including the potential negative outcome ("cost") of the threat being materialized. The Prevent audio is capable of causing a motivated perpetrator to immediately stop advancing and/or to flee the location. Prevent audio may also cause pain and agony, as well as confusion and fear.

The extreme noxious nature of the Prevent audio can lead to emotional reaction, which in turn can lead to the formation of stronger, more durable memories of the noxious event. This, in turn, reduces the likelihood of the individual returning to the location, or repeating the action, that resulted in the Prevent audio stimulus.

In one embodiment, the Prevent audio stimulus is generated by an array of six piezo-electric vibrating elements, each of which generates a sound. In this embodiment, each piezo element is used to output its maximum intensity sound, approximately 125 dB SPL. The array of elements is set to generate sounds of the same frequency, all in phase, with the resulting sound having an effective total intensity of 140 dB SPL or more. The threshold for pain caused by a loud sound depends on the frequency of the sound, and the age and hearing attributes of the listener, but is generally in the range of 120-140 dB SPL. Thus, in this embodiment, the stimulus is loud enough to cause considerable pain to the individual, leading to an immediate flight response, resulting in the individual refraining from the proscribed action. Thus, the Prevent audio stimulus is effective due to its extreme intensity. In this embodiment, the frequency of the sound that is generated is set to a single frequency of 4000 Hz, which at very loud intensity levels is the frequency at which the human auditory system is most sensitive (see Fletcher-Munsen curve or ISO 226-2003), which has the effect of maximizing both the perceived loudness, and the perceived pain of the Prevent audio stimulus. The perceived pitch of 4000 Hz is relatively high, corresponding to one of the highest notes on the standard piano. Thus, in this embodiment the painful sound is also extremely annoying, given the unusually high pitch. This adds to the aversive nature of the sound, enhancing the desire for the individual to flee the area. In this embodiment, the duration of the Prevent audio pulse is constant at maximum amplitude for the entire time that the individual is considered a threat (e.g., while they are touching the enclosure/box that surrounds the Protected Space).

In another embodiment, the sounds are generated by a Long Range Acoustic Device (LRAD), which transmits acoustic energy at 2.5 kHz in a focused beam, over long distances (up to tens of meters or more). In some implementations, the sound energy from an LRAD is focused by using a coherent ultrasound carrier wave, which interacts with the molecules in the air to produce local acoustic waves (sounds). In this embodiment, the sound is not transmitted in all directions, but rather is concentrated in one small region of space. As such, the Prevent sound is directed at the target individual, with great effect; whereas the audio has little or no collateral effect on non-targeted individuals. LRAD devices are used effectively for crowd control and denial of entry actions. The devices can also be used for less-intense audio production, communication, and hailing, which enables the devices to produce all the types of audio interventions described in this system.

In another embodiment, multiple LRAD devices are utilized together. The devices are placed at different locations (one mounted to the ceiling, and one mounted to the wall, 3 meters apart, in this embodiment). The System very rapidly determines the location of the target individual using, in this embodiment, stereo computer vision, laser range finders, and time of flight detectors; and then coordinates the aiming on the LRAD devices to the output audio beams of the two devices coincide at the target, leading to an even more impactful Prevent audio signal. In this embodiment, the two LRAD devices can also operate independently, either generating Prevent audio to two different locations, simultaneously; or deploying different kinds of audio signals (in this embodiment, Prevent audio directed at a target individual, and Caution audio directed at non-target individuals located elsewhere in the space).

In another embodiment, a combination of different audio-generating devices is employed. In this embodiment, a set of powerful loudspeakers, an array of piezo-electric elements, and one or more miniaturized LRAD units are all coordinated to produce Prevent audio of massive intensity at one or more locations in the space at or near the Protected Space. The combination of hardware types allows for different kinds of acoustic signals (in this embodiment, infrasound, sound, and ultrasound) all to be produced simultaneously, at one or more locations and a one or more times. The combination of sound types allows the overall composite sound to be both focused and diffuse; include very low, medium and very high frequencies generated by specialized emitters; and include single or multiple frequency components, play complex audio signals (e.g., recorded speech); and be turned on or off separately.

In another embodiment, the Prevent audio signal is composed of multiple frequencies. In this embodiment, the frequency components include 4000, 1050, and 1040 Hz. The frequency components in the stimulus in this embodiment were chosen for several specific outcomes. First, the frequencies are all highly perceptible, close to the peak perception range. This makes each component of the sound very loud. Further, since sound energy is distributed across multiple "critical bands" within the human auditory system, the power of the frequency components will add, thereby increasing the perceived loudness of the sound. Further, in this embodiment two of the frequency components are close in frequency. The 10 Hz frequency separation will lead to acoustic "beating", which is a periodic warble or increase and decrease in intensity of the overall acoustic signal. In this embodiment the beating will occur at the difference between the frequency components, namely 10 Hz, which is slow enough to be detected by human listeners, and also fast enough to cause an additional unpleasantness in the sound, due to the buzzing aspect of the sound. Other embodiments utilize different specific frequency components.

In another embodiment, many frequency components are deployed in the audio signal, resulting in a "noise" signal. In this embodiment, the intensity of the frequency components is approximately equal, with some random fluctuations, resulting in "white noise". The intense white noise signal is highly aversive, and disrupts communication, as well as thoughts, on the part of the targeted individual. The power of the audio is summed across all the critical bands (not just a few), which leads to the audio being perceived as extremely loud and very disruptive.

In other similar embodiments other types of audio noise (e.g., "pink" or "Brown" or notched noise) are used. In those cases, the intense noise signal can be used to disrupt the individual, as with white noise; however, the specific frequency design of the noise can allow other signals to be perceived. In one such embodiment, there is a frequency notch in the noise (a small range of frequencies at which there is little or no energy). The Prevent audio noise is still extremely loud; however, if a secondary audio signal, in this embodiment a spoken command to drop the weapon, needs to be played, that secondary audio signal is deployed in the frequency notch in the noise. This enables the spoken command to be heard over the noise, without having to reduce the noise intensity from its initial level.

In another embodiment, the Prevent audio signal contains low frequency (infrasound) components, specifically at 19 Hz in this embodiment. Low-frequency acoustic energy, at high intensities, can cause pressure waves that wrap around the human body and cause unusual and disconcerting non-hearing effects on the individual. Different low frequencies will result in resonance in different parts of the body, and therefore different (but still disconcerting) perceptual and physiological phenomena. For example, if the lungs resonate, the individual can experience the feeling of breathlessness. In the present embodiment, the 19 Hz infrasound corresponds to the resonant frequency of the human eyeball; thus, when the Prevent audio is presented at high intensities (120 dB or more, and especially at the 130+ dB levels), the eyeballs of the targeted individual begin to resonate. This leads to the stimulation of the retina by direct vibration, and causes the individual to see visual spots, flashes, or "ghost" images. This visual effect is highly disorienting and disconcerting, and results in immediate flight response. The individual is highly unlikely to continue the proscribed actions, and is likely to develop and maintain a profound, highly valent, and adverse memory of the incident. Other embodiments utilize infrasound of different frequencies and intensities to produce different or additional non-hearing results, including but not limited to breathing irregularities, abdominal discomfort, and balance disruptions.

In another embodiment, the Prevent audio signal includes high frequency components, specifically at 16 kHz in this embodiment. The frequency employed in this signal is less-audible or inaudible to some individuals, particularly adults over the age of 30 years who typically exhibit age-relate high-frequency hearing loss. In this embodiment, the Prevent audio signal is audible and aversive to young individuals, such as toddlers, children, and young adults, but is not perceived by adults. This makes for a binary stimulus (effective against children, but ineffective against adults), which is deployed, in this embodiment, in home applications where the intention is to prevent a child from approaching or accessing a gun that is located in the parents' bedroom. The child hears and is deterred by, the ultrasound, whereas the parent is not affected (or is less affected). Thus, if the parent is required to enter the bedroom (in this embodiment) to interact with (intervene with) the child, the Prevent audio that is debilitating to the child does not impact the parent (or other responding adult). In this embodiment the frequency of the high-frequency audio is fixed. In other embodiments the frequency of the audio is adjusted in advance, depending on the measured perceptual capabilities of the potential occupants of the facility. In one such embodiment, the adults' threshold of auditory perception (the frequency at which the adults can no longer hear audio signals) is measured, and that frequency is used as the low end of the frequency range for Prevent audio signals.

In another related embodiment, multiple frequency components are included in the Prevent signal, with one or more components in the (lower-frequency) range that is audible to both the adults and children, and one or more components are in the (high-frequency) range that is audible only to the child(ren). In this embodiment the high-frequency components are of high intensity and highly aversive, whereas the low-frequency components are less intense and less aversive. This Prevent audio signal in this embodiment is thus audible but not disruptive or debilitating to adults whereas the signal is highly impactful for younger individuals.

In another embodiment, the Prevent audio signal includes very high frequency (ultrasound) components, specifically at 1 MHz in this embodiment. The frequency employed in the signal in this embodiment is in the lower end of the range of ultrasound used in medical imaging. Other embodiments deploy ultrasound at higher or lower frequencies. The ultrasound is deployed from a location close to the individual, such as near the handle of a safe. The intensity of the ultrasound signal is high enough (depending on the distance to the individual) that the individual feels pressure on their body, skin, or hand. This sensation is known as "ultrahaptic" perception, and can be used to provide distal, non-contact sensation of touching or pressing on the skin. Ultrahaptics has been used to provide feedback to the user of a computer system or a warning to the driver of a car, for example. In the present embodiment, however, intense ultrahaptic ultrasound signals result in a physical push away from a location, which in this embodiment is the handle of a safe. The use of ultrasound for haptic impediment or area denial (pushing the hand or entire body away from a target) is novel in this embodiment. Other embodiments use ultrasonic haptics for guidance of an individual, pushing or nudging him or her in a particular direction. Other embodiments of the system use ultrahaptics to create a barrier or virtual fence, which guides the individual where to walk, or prevents the individual from walking in an undesirable direction, or entering a prohibited area.

The Prevent audio signal may be adjusted and or modified, as required, depending on the circumstances, including dynamically. One or more Prevent audio signals may be deployed in response to a given event or threat. When more than one Prevent audio intervention is deployed in response to a single threat or event, the audio signals may be the same, similar, or may be different, in terms of audio attributes, location, and time.

Acoustic/Audio Non-Lethal Weapons in Prevent Intervention

Prevent audio interventions may include ultrasonic, subsonic, or multisonic vibrational energy, including focused-energy weapons.

Multiple Prevent Sources

One or more Prevent interventions, including but not limited to multiple focused-energy weapons, may be directed at a target, individual, or location from one or more source locations. The system determines the location and size of the threat, and may deploy a coordinated multi-source intervention. This may enable a "triangulation" type of effect similar to the manner in which a "gamma-knife" medical system focuses (gamma) energy at a particular spot in the body: there may be limited impact of any one intervention coming from a single direction, but the cumulative impact of all the interventions coinciding at one location, or for one target, can be extreme. This multi-source intervention also makes the system more resistant to defensive strategies on the part of a threatening individual. For example, it will be less possible for the individual to simply turn away from the source of an intervention or hide behind furniture or structure.

Additional System Features

The audio signals, and the hardware used to deploy the audio interventions, are designed to be difficult to localize, in order to prevent an intruder from defending against the audio intervention, and in order to make it more difficult for an intruder to disable the hardware. The audio signals will have frequency components, reverberation, and loudness variations that make it difficult for the human auditory system to localize the sounds.

The system can use audio for communication to one or more non-threat individuals, including but not limited to first responders and other individuals in the facility. The system can use alerts and cautions to communicate to individuals or groups, and may also use recorded, computer-generated, or live audio to make announcements. For example, the system may track the location of a first responder (e.g., police officer), and provide audio cues or directions to that individual about the threat (e.g., the location and weapon status of an intruder).

The system can use audio for crowd management, including but not limited to caution and prevent signals. For example, the system can deploy "Shelter in place!" cautions; or, for example, deploy an audio barrier (i.e., a "virtual audio wall" or "virtual audio gate") at a hallway intersection that prevents individuals from turning down a dangerous hallway. Anyone attempting to go in that direction would be prevented from doing so by the Prevent intervention at that location; going in the other direction would be the path naturally chosen by the crowd.

Multiple Modalities in Interventions

In addition to audio stimuli, each level of intervention may include one or more additional stimulus elements via other sensory mechanisms, including visual stimuli, olfactory stimuli, cutaneous stimuli (including but not limited to electrical shocks and noxious chemicals), gustatory (tasted) stimuli, and any other means of stimulating one or more individuals.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the disclosure. As used herein, the singular forms "a", "an" and "the" are intended to include the plural forms as well, unless the context clearly indicates otherwise. Furthermore, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form described. Many modifications and variations will be apparent to those of ordinary skill in the art without departing from the scope and spirit of the disclosure. The embodiment was chosen and described in order to explain the principles of the disclosure and the practical application, and to enable others of ordinary skill in the art to understand the disclosure for various embodiments with various modifications as are suited to the particular use contemplated.

Although this disclosure has been described in connection with specific forms and embodiments thereof, it will be appreciated that various modifications other than those discussed above may be resorted to without departing from the spirit or scope of the disclosure as defined in the claims. For example, functionally equivalent elements may be substituted for those specifically shown and described, certain features may be used independently of other features, and in certain cases, particular locations of the elements may be reversed or interposed, all without departing from the spirit or scope of the disclosure as defined in the claims.

I claim:

1. A deterrent system comprising:

a sensor configured to (i) monitor an area to be protected, wherein the area comprises a Protected Space and a plurality of Buffer Zones outside the Protected Space and (ii) determine whether a target has entered the Protected Space or any of the plurality of Buffer Zones;

access rules to determine a response to be delivered by a countermeasure if the target has entered the area;

a deterrent component configured to deliver the countermeasure, wherein the countermeasure is an acoustic countermeasure designed to cause behavioral change to at least one of the target and others in the area, and wherein the deterrent system, upon determining the target has entered the area, is configured to make a determination as to the type of acoustic countermeasure to be delivered to the target based on (i) the access rules and (ii) a distance between the target and the deterrent component.

2. The deterrent system of claim 1, wherein the sensor comprises of one or more cameras, LIDAR, ultrasound distance measurement, laser range finders, time of flight detectors, stereoscopic cameras, pressure sensors, movement sensors, magnetometers, microphones, hydrophones, or vibration sensors to monitor contents or measure the activities of a physical location.

3. The deterrent system of claim 1, wherein the plurality of Buffer Zones are defined to deny or slow access by the target to the Protected Space's location or contents via use of countermeasures.

4. The deterrent system of claim 1, wherein the plurality of Buffer Zones are defined around the Protected Space to provide incremental countermeasures to deter the target from accessing the Protected Space.

5. The deterrent system of claim 1, wherein the Protected Space and plurality of Buffer Zones are defined automatically or via the user by using a manual interface, graphical user interface (GUI), speech user interface, or via an import from a computer vision system.

6. The deterrent system of claim 5, wherein the definition of the Protected Space is created automatically via interrogating a local space and considering walls, floors, the local space's purpose, likely inhabitants and activities, and types of contents expected in the Protected Space.

7. The deterrent system of claim 6, wherein the interrogation of the local space is compared to a database of previously configured similar spaces to establish the virtual or physical boundaries of the Protected Space and the plurality of Buffer Zones.

8. The deterrent system of claim 5, wherein the definitions of the Protected Space and the plurality of Buffer Zones are created via a user generating physical or virtual boundaries using one or more points, planes, or radii overlaid on a rendering of a local space.

9. The deterrent system of claim 1, wherein sensor data obtained from the sensor is compared against a set of rules using a single value or a combination of values comprising boundaries, activities, time of day, day of the week, season of the year, knowledge of expected events, speed of the target, sounds, including frequencies, intensity, location, duration, pattern, words from human speech, speech content, speech meaning, or speech inflection, age of target, whether the target is a vehicle occupant, weather, including temperature, pressure, humidity, wind speed, freeze warnings, or precipitation amounts, whether the individual have an object of interest on them, or objects in the space to determine what is considered a breach of the Protected Spaces or the plurality of Buffer Zones.

10. The deterrent system of claim 4, wherein the incremental countermeasures allow release of selectable levels of static or dynamic interventions determined by the access rules via loudspeakers or transducers that produce frequencies that can be heard, felt or experienced by humans or animals.

11. The deterrent system of claim 10, wherein the countermeasures are configured to provide a minimal level of alerting and notification of threats, events, or status of the facility using speech, tonal sounds, vibrational energy, or a combination thereof.

12. The deterrent system of claim 10, wherein if the target breaches subsequent Buffer Zones of the plurality of Buffer Zones, wherein the subsequent Buffer Zones are each closer to the Protected Space, then the deterrent system increases the level of countermeasure by further increasing volume, startle response content of messages, frequencies, repetition or a combination thereof.

13. The deterrent system of claim 10 wherein if the target enters the Protected Space, the deterrent system maximizes the countermeasure by maximizing the volume, startle response content of messages, frequencies, repetition or a combination thereof.

14. The deterrent system of claim 9, wherein when the system determines a breach has occurred of the Protected Space or one of the plurality of Buffer Zones, the system then computes the appropriate countermeasure based on automatic rules or rules defined by the user.

15. The deterrent system of claim 1, wherein after the countermeasure is emitted, the system is configured to assess the effect of the countermeasure by comparing the target's action in response to the countermeasure against a ruleset defined by the user to determine if the countermeasure was effective, wherein the countermeasure is determined to be effective based on determination of the target retreating, slowing, leaving, stopping, dropping an object, trapping, or disarming.

16. The deterrent system of claim 15, wherein if the system determines the countermeasure was effective, then the system emits or withholds countermeasures of the same or less potency as previously used.

17. The deterrent system of claim 15, wherein if the system determines the countermeasure was not effective, then the system emits the same or greater countermeasures than previously used.

18. The deterrent system of claim 15, wherein the system emits countermeasures until desired outcome of the situation is realized.

19. The deterrent system of claim 1, wherein the deterrent system is configured to deliver at least one of the following increasing types of intervention to the target based on target's proximity to the Protected Space: alert intervention, caution intervention, and prevent intervention.

20. The deterrent system of claim 19, wherein the alert intervention is designed to cause at least one of the following: behavioral changes to the target and caution to others in the Protected Zone or plurality of Buffer Zones, and the alert intervention is an alert audio designed to be audible over background noises and to be attention grabbing.

21. The deterrent system of claim 20, wherein the alert intervention comprises at least one of the following non-speech categories of audio: organic, engineered, algorithmic, composed, and random.

22. The deterrent system of claim 19, wherein the caution intervention is designed to have a greater impact on the target than the alert intervention, and attributes of the caution intervention are louder than the alert intervention.

23. The deterrent system of claim 19, wherein the prevent intervention is designed to have a greater impact on the target than the caution intervention, and attributes of the prevent intervention are louder than the caution intervention.

* * * * *